Patented Apr. 29, 1952

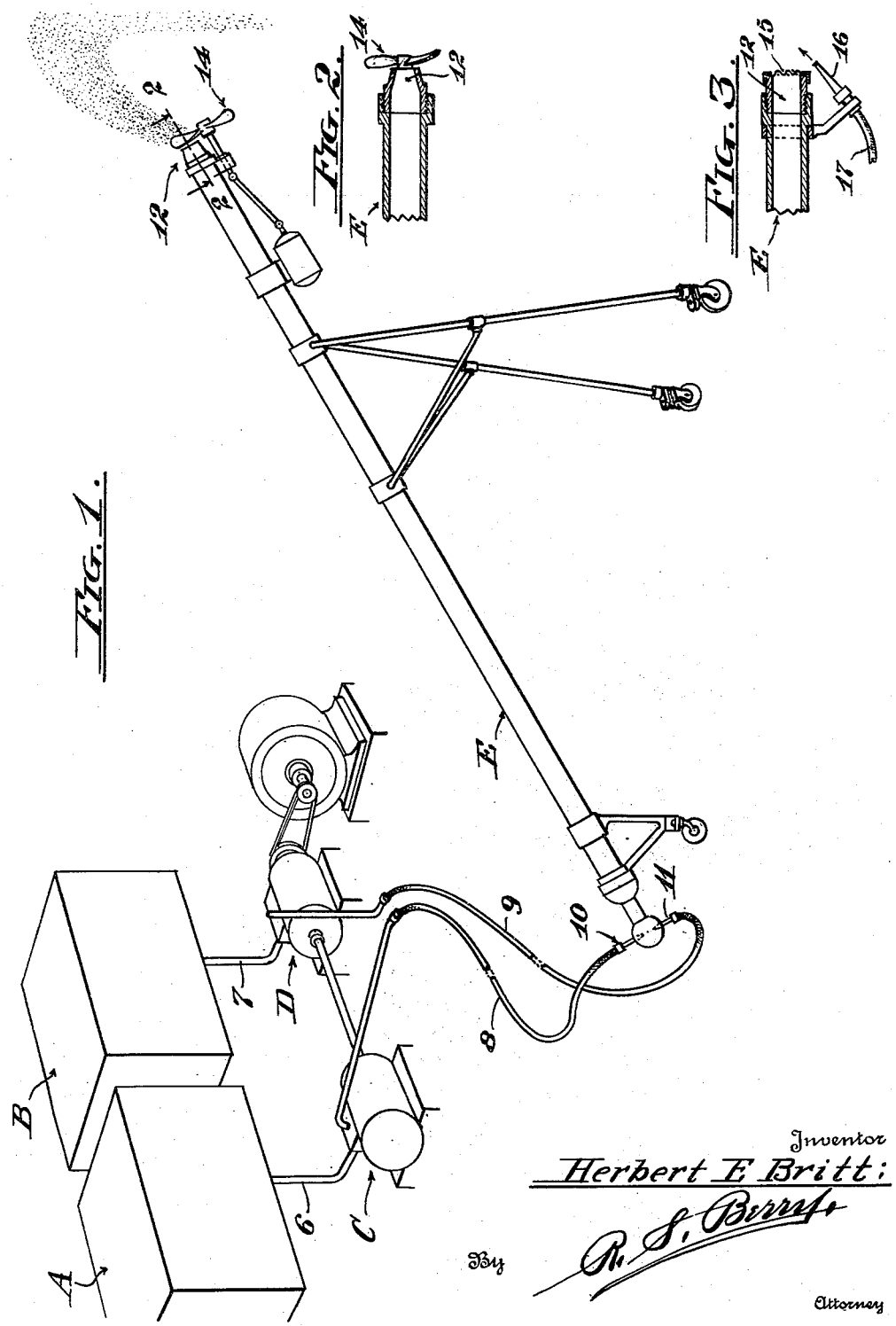

2,594,725

UNITED STATES PATENT OFFICE 2,594,725

METHOD OF PRODUCING ARTIFICIAL SNOW

Herbert E. Britt, Los Angeles, Calif.

Application January 6, 1948, Serial No. 821

4 Claims. (Cl. 41—10)

This invention relates to a method of producing artificial frozen water which is particularly applicable for use in obtaining photographic effects of snow, ice, hail, sleet and the like, as in the production of pictures depicting winter scenes, snow storms, blizzards and similar phenomenon and especially in the taking of motion pictures embodying such appearances.

The primary object of this invention is to provide a method whereby artificial or imitation frozen water may be readily and economically produced, and applied particularly in covering large areas such as stages, streets, buildings, etc. used for photographic purposes.

Another object is to provide a mode of producing artificial frozen water whereby the product may be utilized as it is made to give the appearance of falling snow, sleet or hail, and also applied to a surface to produce the effect of fallen snow, frost or deposits of sleet or hail.

Another object is to provide a process of the above character which may be utilized in producing the appearance of ice either as a covering of a surface such as in forming an ice-sheet or in the representation of cakes or bodies of ice, icicles and the like.

Another object is to provide a method whereby imitation frozen water in its various aspects may be produced by the admixture of two liquids having the property of chemically combining to produce a gel, and to so intermix the liquids as to form a uniform gel which is stiff and friable and capable of being worked and applied to produce the desired effects.

Another object is to provide a mode of producing artificial frozen water in its various aspects by intermixing a liquid alkali and a liquid acid capable of forming a gel or changing from a liquid phase to a solid phase, and effecting such intermixing in a manner to insure thorough intermingling and coaction of the liquids and at the same time afford a delayed action or lag in gelling of the mixture to permit of its movement in a liquid state to a point of application, such as spreading over a surface in the production of imitation ice, or pouring in molds as in producing simulated icicles or other molded forms of ice-like character, or spraying into atmosphere to form imitation frost, sleet or hail, or to produce an advancing ribbon or extrusion of friable gel to be broken into small crystal like or flocculent particles having the appearance of snow.

A further object is to provide a method of producing an imitation frozen water of the nature and for the purpose above recited which not only has the appearance of the natural substance but possesses certain of its physical properties such as moisture and the quality of liquifying under proper conditions and in the case of artificial snow being capable of being deposited in a mass of flaky particles which may be handled and treated like snow as in shoveling, or packing in making snow balls and snow figures, and which may be waded in or traversed on snow shoes, skis, or sleds, and in the case of artificial sleet when blown against surfaces will cling thereto, and when produced to represent hail is resilient and capable of bouncing on striking a surface.

A still further object is to provide a method of producing a water soluble imitation frozen water in its various forms which may be readily removed from surfaces on which it may be deposited, as by brushing, sweeping or shoveling when in a flocculent or comminuted state, or by dissolving by the application of water as by washing, spraying or flooding.

In attaining the objects above recited together with any other objects and advantages as may subsequently appear there is first provided at least two liquids which are capable on being intermixed of forming a stiff, friable gel.

While many liquids on being combined react to form gels and solids it is important in carrying out the present invention to produce a gel in a particular manner, namely with an appreciable time lag or delay in the gelling action after mixing the liquids in order to enable complete intermixture of the liquid substances and thus insure uniformity of the resultant gel, and also to enable the application or the treatment or working of the mixture to produce the desired effects.

The liquids preferably employed are a solution of sodium silicate and a solution of phosphoric acid either alone or combined with acetic acid, these materials or substances being preferably used by reason of their low cost and their availability, and because they produce very satisfactory results, although other acids and other base gel forming substances may be used as will hereinafter be pointed out.

The acid to be employed comprises a weak solution in water of a weak acid having a dissociation constant of one of the acid radicals, if there be more than one, of $10^{-6}$ or less. An example of such solution is one composed of phosphoric acid, pure acetic acid and water in the following proportions:

8 grams $H_3PO_4$
2 grams $CH_3CO_2H$
90 grams $H_2O$

The type of sodium silicate preferably used in making a solution to be combined with the acid solution comprises the following constituents in the recited proportions:

8.9 grams $Na_2O$
28.7 grams $Si_2O_2$
62.4 grams $H_2O$

The sodium silicate solution to be combined with the acid solution is prepared by intermixing 69.6 grams of the above named type sodium silicate and 50 grams of water.

These solutions are intermixed to form the requisite gel as will be later described and in a fashion illustrated by way of example in the accompanying drawing in which:

Fig. 1 is a diagram of an apparatus adapted to carry the invention into effect;

Fig. 2 is a detail in section taken on the line 2—2 of Fig. 1 showing one form of discharge outlet with which the apparatus may be equipped; and Figure 3 is a detail in longitudinal section of another form of discharge outlet which may be substituted for that shown in Figs. 1 and 2.

The specific solutions above specified are given by way of example and not by way of limitation since the proportions of the solutions may be varied within limits without departing from the invention; it being essential however that the solutions be of such strength as to form a gel when combined and that the acid solution be of such weakness as not to effect instantaneous gelling of the silicate and form lumps instead of a uniform gel.

It is desirable, however, to employ the stated proportions since it embodies a minimum of solids and also because it produces a neutral compound; the mixture or product having a pH of between 7 and 8, thus obviating undesirable solvent effects due to excess acidity or alkalinity.

The recited example produces a gel that is highly satisfactory in the production of snow or hail, but where it is desired to produce a softer gel as in the production of sleet, water is added to the solutions as required, and when it is desired to produce a stiffer or harder gel the stated amount of water in the solutions is reduced as required.

Furthermore the amount of the acid may be varied in relation to sodium silicate to some extent. For example when it is desired to slow down the time it takes for the combined liquids to gel more acid of low association constant may be used. However, the use of acetic acid in the acid solution may be dispensed with since its purpose is to shorten the gelling time of phosphoric acid above and accordingly by eliminating acetic acid and using slightly less phosphoric acid the gelling time will be slower, but the gel will be rendered softer as may be desired in the production of artificial sleet.

As carrying out the invention is effected in the field, that is at the place or locale where it is desired to produce the effect of frozen water in any of its aspects, it comes within the province of the operator to determine what strength of the solutions or relative proportions is most desirable to meet the requirements of the occasion, as varying conditions may necessitate variations in the strength of solutions and relative proportions thereof.

In some instances it is desirable to add a thickening agent to the solutions to increase their viscosity in order to get better sealing property in pumps and impart a lubricating property thereto, which facilitates delivering the solutions to a mixing chamber as hereinafter described. Various materials are suitable for this purpose such as clays of the aluminum or magnesium type, powdered aluminum silicate, magnesium silicate, gum tragacanth, and the like. The materials bentonite, glucose, and methyl cellulose have proven quite satisfactory as a thickening agent. The quantity of thickening agent used in proportion to a given amount of the gel forming liquids is determined by the operator according to requirements and the effect to be obtained.

Carrying out of the invention is not dependent upon the employment of the above recited substances, since solutions of other materials capable of producing a gel when combined may be used although those above specified have been found to be quite satisfactory and to give the optimum of results as well as being economical and plentiful. Materials that may be employed in the preparation of the gel forming acid solution are boric acid, citric acid, mono sodium phosphate, sodium phosphate, and sodium bicarbonate, which substances may be employed separately or in conjunction with others thereof.

Other base gel forming materials which may be formed in solution and used with any of the recited acid solutions in carrying out the invention are sodium silicate, potassium silicate, and aluminum hydroxide.

The invention further embraces the employment of various substances other than those hereinbefore mentioned and contemplates the use in the manner set forth of any liquid base substance and any liquid acid which are capable on being intermixed to change from a liquid phase to a solid phase of colloidal character in a continuous flow in which the time rate of gelling can be controlled. Examples of such substances are gelatine, or agar-agar, coagulated casein, albumen, starch, methyl cellulose, and colloidal solutions such as produced by bentonite, which will flocculate on being treated with an acid or be converted into a fragile gel. Tannic acid may be used to congeal liquid gelatine.

Other base substances subject to being congealed by acids are ferric hydroxide and chromium hydroxide.

An important feature of the invention is the mode of effecting the intermixture of the gel forming solutions so as to insure a thorough mixture with a resultant uniform product. To accomplish this and enable the production of the product in considerable quantity in a short space of time, the solutions are brought together in the form of streams within a confined space where, after a short lapse of time gelling of the intermixed solutions takes place by reason of the chemical coaction of the constituents thereof; the acid being weak as above stated so that gelling will not occur immediately on contact of the acid and base solution but will be delayed for an interval of time sufficient to permit application of the combined solutions to a surface before gelling takes place as in creating a coating of ice-like appearance, and to permit spraying of the solution into space where gelling will occur in the form of small globules having the appearance of hail, and to permit formation of an extruded ribbon of fragile gel which is broken up into minute particles that are directed onto a surface to give the appearance of fallen snow or are ejected into space so as to impart the appearance of falling snow. In the example above given the gelling time is from 5 to 8 seconds.

Referring to the accompanying drawing of an apparatus suitable for carrying the invention into effect, A and B designate tanks for containing the sodium silicate and acid solutions. Discharge conduits 6 and 7 lead from the tanks to pumps C and D from the discharge sides of which lead conduits 8 and 9 terminating in nozzles 10 and 11 opening into the inner end of a portable tubular mixing chamber E which is fitted at its outer end with a discharge outlet 12.

In order to accomplish the aforesaid intermixture of the solutions in a continuous fashion the solutions are fed into the mixing chamber by the pumps C and D which are adapted to deliver continuous streams of the solutions into the mixing chamber in definite predetermined proportions such as in equal volumes and to cause the mixture to advance under pressure of the pumps to and through the discharge outlet 12. The mixing chamber E is elongated, being preferably in the form of a length of tubing, and is of such length as to insure thorough intermixture of the solutions passing therethrough and before discharge of the mixture from the chamber occurs. The length of the tubing is predetermined according to the rate of flow of the solutions therethrough and whether it is desired to discharge the mixture from the tube or mixing chamber in a liquid state or in its gelled state; the tube being elongated in the latter instance to afford requisite time for formation of the gel during advance of the mixture to discharge.

When the mixture is discharged from the mixing chamber in the form of an extruded ribbon of gel it is broken up and scattered in any suitable fashion as by directing the extruded mass of gel into the path of rotating blades 14 which act to both break up the gel into small particles and to propel the particles into space. Another mode of fracturing the extruded mass of gel into minute particles is to force it through a screen into the path of a stream or streams of air such as to effect dispersion of the resultant particles. In this event the discharge outlet 12 is fitted with a screen 15 as shown in Fig. 4 and a nozzle 16 on a conduit 17 leading from a source of air under pressure is arranged to direct an air stream diagonally upward in front of the screened discharge outlet. It will be understood that a continuous feed of the extruded mass of gel will be effected by pressure of the solutions through the mixing chamber under the urge of pressure developed by the pumps with which the solutions are directed into the mixing chamber.

The fine particles of the gel thus produced and constituting the product artificial snow, not only has the appearance of snow both when falling in space or when accumulated in mass, but the product also has the physical property of snow in that it is sufficiently slippery to accommodate sleds and may be waded in, or traversed on snow shoes or skis. It is quite light and fluffy but sufficiently moist to permit its being compacted as in forming "snow balls," "snow men" and the like. It is quite harmless to most surfaces with which it may be brought in contact.

In the production of artificial hail the intermixed solutions are ejected from the mixing chamber in the form of a spray or jet so that droplets of the liquid will gel in space and will fall as globules having the appearance of hail; the globules bouncing when striking a surface and accumulating in mass in a manner similar to that of natural hail.

In like fashion to produce a coating of ice or an ice sheet the intermixed liquid solutions are poured or sprayed onto a surface and allowed to gel thereon and thus produce the desired ice-like effect.

The intermixed liquid solutions may also be poured into molds and allowed to gel therein. Imitation icicles or bodies of ice may be produced in this fashion.

Because of the gel consisting mostly of water it closely resembles frozen water without freezing it, on being worked or applied as above set forth, and because of its large water content and the low cost and abundance of the solid constituents thereof the gel may be cheaply produced. By forming the gel in the fashion set forth and working and applying it in accordance with the invention here disclosed the various frozen water effects may be economically carried out. Large areas may be quickly covered with the product and may be quickly and easily cleansed thereof.

An important feature of the invention lies in the fact that the artificial frozen water produced thereby by reason of its large water content has light refractive properties comparable to that of natural frozen water especially when fractured, and accordingly the invention possesses considerable utility in the production of scenic effects for photographic purposes, and has the decided advantage over natural frozen water in that it endures for a prolonged period without material deterioration at normal temperatures. A marked advantage of this process over the use of natural frozen water is the absence of cold. In fact the gel may be heated either before or during its application and accordingly the process is applicable to the production of a warm artificial frozen water product.

Coloring material is added to the solutions when it is desired to impart color effects to the frozen water product.

I claim:

1. The method of producing flocculent artificial snow consisting in taking two liquids including phosphoric acid and sodium silicate which are capable of coacting when intermixed to form a fragile gel, coincidently directing such liquids separately under pressure into intermixed contact with each other through a mixing chamber in which gelling of the liquids takes place, extruding the resultant gel and breaking the gel into fractured minute flaky particles.

2. A method of forming flocculent artificial snow consisting in forming a solution of sodium silicate and a solution of weak phosphoric acid, separately but coincidently delivering said solutions under pressure into a confined mixing chamber in a manner to effect thorough intermixture of the solution before reaction between the solutions occurs, subjecting the mixture to pressure until and while discharge thereof from the mixing chamber is being effected in the form of an extrusion of gel and subjecting the gel as it is being extruded to impact thereby fracturing the gel into minute snow-like particles.

3. A method of forming flocculent artificial snow consisting in forming a solution of sodium silicate and a solution of weak phosphoric acid, separately but coincidently delivering said solutions under pressure into a confined mixing chamber in a manner to effect thorough intermixture of the solution before reaction between the solutions occurs, subjecting the mixture to pressure until and while discharge thereof from the mixing chamber is being effected and dividing the discharged mixture into fractured particles.

4. A method of forming flocculent artificial snow consisting in forming a solution of sodium silicate and a solution of weak phosphoric acid, separately but coincidently delivering said solutions under pressure into a confined mixing chamber in a manner to effect thorough intermixture of the solution before reaction between the solutions occurs, subjecting the mixture to pressure until and while discharge thereof from the mixing chamber is being effected in the form of an extrusion of gel, and subjecting the gel as it is being extruded to impact thereby fracturing the gel into minute snow-like particles.

HERBERT E. BRITT.

REFERENCES CITED

The following references are of record in the file of this patent:

UNITED STATES PATENTS

| Number | Name | Date |
| --- | --- | --- |
| 1,506,118 | Grovers | Aug. 26, 1924 |
| 1,539,342 | Williams | May 26, 1925 |
| 1,890,127 | Oftedahl | Dec. 6, 1932 |
| 2,147,985 | McKinney | Feb. 21, 1939 |
| 2,284,248 | Baker et al. | May 26, 1942 |
| 2,384,946 | Marisic | Sept. 18, 1945 |
| 2,442,784 | Shabaker | June 8, 1948 |